United States Patent
Yamaguchi et al.

(10) Patent No.: US 12,059,729 B2
(45) Date of Patent: Aug. 13, 2024

(54) METHOD FOR MANUFACTURING METAL PRINTED OBJECT

(71) Applicant: TAIYO NIPPON SANSO CORPORATION, Tokyo (JP)

(72) Inventors: Yusuke Yamaguchi, Tokyo (JP); Toyoyuki Sato, Tokyo (JP); Tomoaki Sasaki, Tokyo (JP); Hiroki Amano, Tokyo (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 956 days.

(21) Appl. No.: 17/044,053

(22) PCT Filed: Apr. 17, 2019

(86) PCT No.: PCT/JP2019/016474
§ 371 (c)(1),
(2) Date: Sep. 30, 2020

(87) PCT Pub. No.: WO2019/203272
PCT Pub. Date: Oct. 24, 2019

(65) Prior Publication Data
US 2021/0060644 A1    Mar. 4, 2021

(30) Foreign Application Priority Data

Apr. 20, 2018  (JP) ................ 2018-081625

(51) Int. Cl.
*B22F 3/10* (2006.01)
*B22F 10/00* (2021.01)
(Continued)

(52) U.S. Cl.
CPC ............ *B22F 3/1007* (2013.01); *B22F 10/00* (2021.01); *B23K 26/123* (2013.01);
(Continued)

(58) Field of Classification Search
CPC ........ B33Y 10/00; B22F 3/1007; B22F 10/00; B22F 2201/12; B23K 26/123; B23K 26/342
See application file for complete search history.

(56) References Cited

U.S. PATENT DOCUMENTS

| 6,215,093 B1* | 4/2001 | Meiners ................ B23K 26/32 |
| | | 219/121.84 |
| 2010/0111744 A1 | 5/2010 | Schleiss et al. |

(Continued)

FOREIGN PATENT DOCUMENTS

| CN | 105 478 766 A | 4/2016 |
| EP | 3 187 286 | 7/2017 |

(Continued)

OTHER PUBLICATIONS

Jie Song et.al. "Numerical and experimental study of laser aided additive manufacturing for melt-pool profile and grain orientation analysis", Materials and Design 137 (2018) 286-297 (available online Oct. 13, 2017) (Year: 2017).*

(Continued)

*Primary Examiner* — Brian D Walck
*Assistant Examiner* — Nazmun Nahar Shams
(74) *Attorney, Agent, or Firm* — Nixon & Vanderhye P.C.

(57) ABSTRACT

An object of the present invention is to provide a method for manufacturing a metal printed object that can reduce the generation of sputters, and the present invention provides a method for manufacturing a metal printed object in which, in the presence of a shielding gas supplied around metal powder in a chamber, heat is supplied to the metal powder using energy rays to form a metal layer and laminate the metal layer, wherein the mass per unit volume of the shielding gas at a temperature of 25° C. and a pressure of 0.1 MPa is $1.30 \times 10^{-3}$ g/cm³ or less.

4 Claims, 3 Drawing Sheets

(51) Int. Cl.
 *B23K 26/12* (2014.01)
 *B23K 26/342* (2014.01)
 *B33Y 10/00* (2015.01)

(52) U.S. Cl.
 CPC ............ *B23K 26/342* (2015.10); *B33Y 10/00* (2014.12); *B22F 2201/12* (2013.01)

(56) References Cited

U.S. PATENT DOCUMENTS

2017/0165781 A1* 6/2017 Veldsman ................ B23K 9/04
2017/0182594 A1* 6/2017 Crear ................. B23K 26/1437
2017/0259337 A1 9/2017 Furukawa

FOREIGN PATENT DOCUMENTS

| JP | 2012-224919 | 11/2012 |
|----|-------------|---------|
| JP | 2017-007253 | 1/2017 |
| JP | 2017-030353 | 2/2017 |
| JP | 2017-137568 | 8/2017 |
| WO | 2017/079091 | 5/2017 |
| WO | 2017/081813 | 5/2017 |
| WO | 2017/100695 | 6/2017 |

OTHER PUBLICATIONS

Zhang Ruihua et.al. [CN105478766A] (machine Translation) (Year: 2016).*
International Search Report for PCT/JP2019/016474 mailed Jun. 11, 2019, 4 pages.
Office Action dated Nov. 15, 2022 issued in Japanese Application No. 2020-514414 with English translation (6 pages).
Extended European Search Report dated Nov. 4, 2021 issued in European Application No. 19789153.4 (19 pages).

* cited by examiner

METHOD FOR MANUFACTURING METAL PRINTED OBJECT

This application is the U.S. national phase of International Application No. PCT/JP2019/016474 filed Apr. 17, 2019 which designated the U.S. and claims priority to Japanese Patent Application No. 2018-081625 filed Apr. 20, 2018, the entire contents of each of which are hereby incorporated by reference.

TECHNICAL FIELD

The present invention relates to a method for manufacturing a metal printed object.

BACKGROUND ART

An additive manufacturing technology called "Additive Manufacturing" is known. Additive manufacturing technology has attracted attention as a promising technology in advanced technology fields such as the aircraft industry and medical care because a three-dimensional structure having an arbitrary shape can be manufactured with an arbitrary material (Patent Document 1).

A metal 3D printer is known as an example of an apparatus that uses an additive manufacturing technique. A metal 3D printer can manufacture a metal printed object by laminating metal layers obtained by heating metal powder with energy rays such as a laser.

When metal powder is heated with a laser, and the like, scatters of molten metal called sputters are generated as by-products, and the sputters scatter in the chamber of the apparatus. The generation of the sputters can cause the problems described below, for example.

Some of the sputters scatter in the chamber and then fall onto the surface of the metal powder. The sputters that have fallen onto the surface of the metal powder will be heated again by the laser. The result is a metal printed object containing a metal that has been heated many times. Therefore, the generation of the sputters may cause the mechanical strength of the metal printed object to decrease.

If the sputters are scattered in the area in which the laser passes, the irradiation of the laser is blocked by the sputters. As a result, the amount of heat energy supplied to the metal powder becomes unstable, and heating of the metal powder becomes insufficient. Therefore, the generation of the sputters may cause a decrease in surface roughness and mechanical strength of the metal printed object.

Patent Document 1 discloses an additive manufacturing apparatus including a powder dispenser and a powder supply assembly configured to supply powder to the powder dispenser. The powder supply assembly disclosed in Patent Document 1 has a sieve.

PRIOR ART DOCUMENTS

Patent Documents

Patent Document 1 Japanese Unexamined Patent Application, First Publication No. 2017-30353

SUMMARY OF INVENTION

Problem to be Solved by the Invention

However, in the additive manufacturing apparatus disclosed in Patent Document 1, there are no details about fundamentally reducing the generation of the sputters. Further, in the additive manufacturing apparatus disclosed in Patent Document 1, it is not possible to remove small sputters that are finer than the mesh of the sieve.

Therefore, in the additive manufacturing apparatus disclosed in Patent Document 1, the problems above due to the generation of the sputters inevitably occur.

An object of the present invention is to provide a method for manufacturing a metal printed object that can reduce the generation of the sputters.

Means for Solving the Problem

[1] A method for manufacturing a metal printed object in which, in the presence of a shielding gas supplied around metal powder in a chamber, heat is supplied to the metal powder using energy rays to form a metal layer and the metal layer is laminated,
   wherein the mass per unit volume of the shielding gas at a temperature of 25° C. and a pressure of 0.1 MPa is $1.30 \times 10^{-3}$ g/cm$^3$ or less.

[2] The method for manufacturing a metal printed object according to [1],
   wherein the shielding gas contains 20% by volume or more of helium with respect to 100% by volume of the shielding gas.

[3] The method for manufacturing a metal printed object according to [1] or [2],
   wherein the shield gas contains 5% by volume or less of oxygen with respect to 100% by volume of the shield gas.

[4] The method for manufacturing a metal printed object according to any one of [1] to [3],
   wherein a gauge pressure in the chamber is 0 to 0.1 MPa.

[5] The method for manufacturing a metal printed object according to any of [1] to [4],
   wherein a composition of the shield gas is selected according to the metal powder.

Effects of the Invention

According to the method for manufacturing a metal printed object of the present invention, the generation of the sputters can be reduced.

DETAILED DESCRIPTION OF THE PREFERRED EMBODIMENTS

Figure 1:
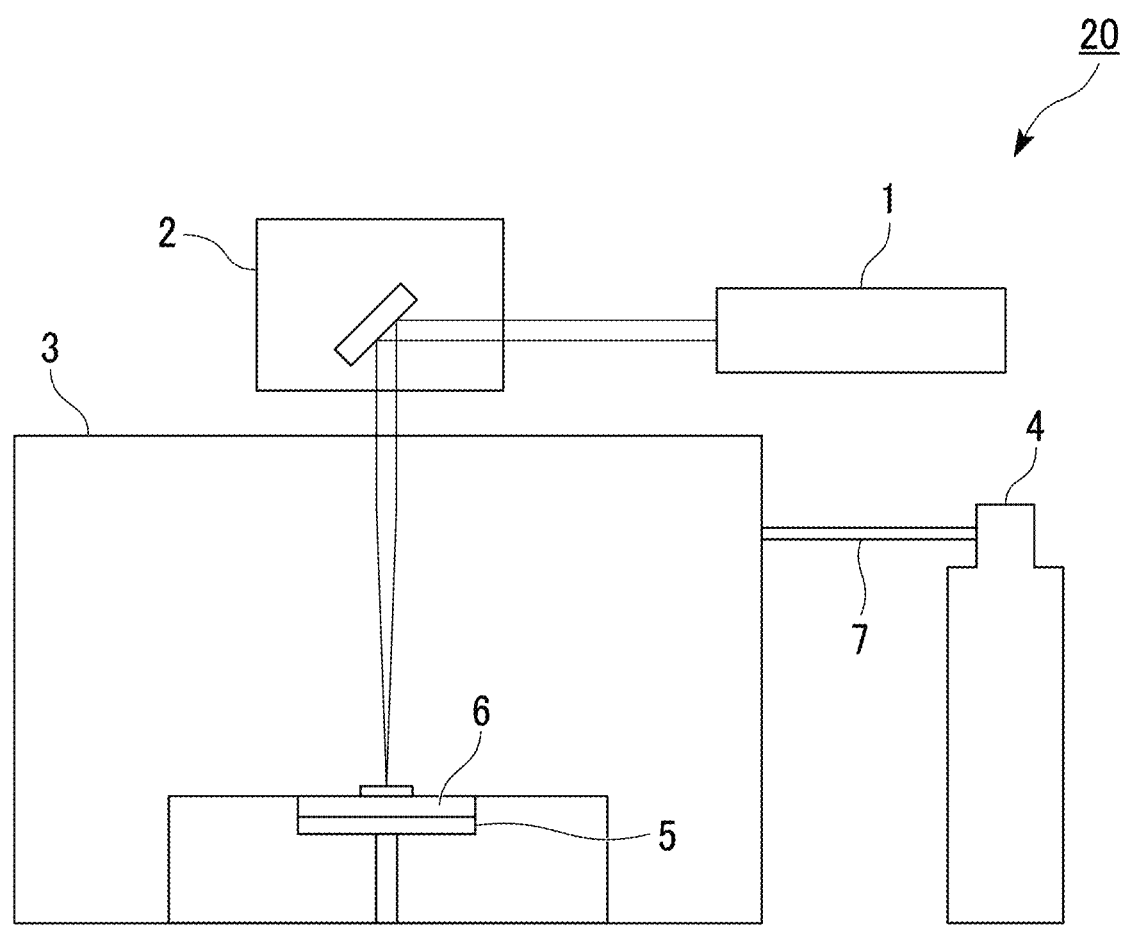
FIG. 1 is a schematic diagram showing a configuration of a metal printed object manufacturing apparatus to which a metal printed object manufacturing method according to an embodiment can be applied.

In the present description, the "mass per unit volume [g/cm$^3$]" of gas is a value which is measured under the conditions of a temperature of 25° C. and a pressure of 0.1 MPa using a gas density meter (manufactured by Yokogawa Electric Corporation).

In the present description, the "gauge pressure" is a value which is measured using a Bourdon tube pressure gauge at 25° C.

In the present description, "~" indicating a numerical range means a numerical range in which the numerical values on the left and right sides thereof are the lower limit value and the upper limit value.

Hereinafter, a method for manufacturing a metal printed object according to this embodiment will be described in detail with reference to the drawings. Note that, in the drawings used in the following description, in order to make the features easy to understand, there may be a case in which features are enlarged for convenience, and it is not always the case that the dimensional ratios of the respective components are the same as the actual ones.

FIG. 1 is a schematic diagram showing a configuration of a metal printed object manufacturing apparatus 20 to which the method for manufacturing a metal printed object of the present embodiment can be applied. As shown in FIG. 1, the metal printed object manufacturing apparatus 20 includes a laser oscillator 1, an optical system 2, a chamber 3, and a shield gas supply source 4.

The configuration of the metal printed object manufacturing apparatus 20 will be described below.

The laser oscillator 1 is not particularly limited as long as it can irradiate a laser. The laser oscillator 1 irradiates the laser into the chamber 3 via the optical system 2. As a result, the metal printed object manufacturing apparatus 20 can sinter or melt and solidify metal powder at the position irradiated with the laser. Thereby, a layer (hereinafter referred to as "metal layer") containing a sintered product of the metal powder or a molten solidified product of the metal powder is formed in the chamber 3.

The optical system 2 is not particularly limited as long as the reflection position of the laser emitted from the laser oscillator 1 to the metal powder can be controlled according to the data input in advance. The optical system 2 can be composed of, for example, one or more reflecting mirrors.

The metal printed object manufacturing apparatus 20 can control the laser irradiation position on the metal powder by controlling the optical system 2 according to the data input in advance. Thereby, the metal printed object manufacturing apparatus 20 can print the metal layer into an arbitrary shape.

Examples of the metal powder include powders of various metals such as carbon, boron, magnesium, calcium, chromium, copper, iron, manganese, molybdenum, cobalt, nickel, hafnium, niobium, titanium, aluminum and alloys thereof.

When the metal powder is in the form of particles, the particle size of the metal powder is not particularly limited, but can be, for example, about 10 μm~200 μm.

The chamber 3 is a casing in which the operation of irradiating the metal powder with the laser to form the metal layer and laminating the metal layers is repeated. The chamber 3 is not particularly limited as long as it can fill the inside with the shield gas. The upper side surface of the chamber 3 is connected to the pipeline 7. The shield gas is introduced into the chamber 3 from a supply source 4 of the shield gas via the pipeline 7. The shield gas is a gas supplied around the metal powder in the chamber 3.

The chamber 3 has a modeling stage 5. The modeling stage 5 is a place for repeating the modeling of the metal layer and the lamination of the modeled metal layer. A base plate 6 is placed on the upper surface of the modeling stage 5.

The base plate 6 is a plate for mounting the metal printed object. In the state shown in FIG. 1, the metal powder is spread on the upper side of the base plate 6.

The base plate 6 contacts the metal layer that constitutes the bottom layer of the metal printed object. The metal layer forming the bottom layer of the metal printed object is a metal layer formed by the laser that is first irradiated when manufacturing the metal printed object.

A method for manufacturing a metal printed object according to the present embodiment will be specifically described by using the metal printed object manufacturing apparatus 20 having the configuration above with reference to FIG. 1.

In the method for manufacturing a metal printed object of the present embodiment, heat is supplied to the metal powder using energy rays in the presence of a shielding gas, a metal layer is formed, and the metal layer is laminated.

First, before forming the metal layer, the shield gas is supplied from the supply source 4 of the shield gas into the chamber 3. This makes it possible to fill the chamber 3 with the shield gas.

However, in the method for manufacturing a metal printed object of the present embodiment, it is preferable to purge oxygen remaining in the chamber 3 from the inside of the chamber 3 before supplying the shielding gas into the chamber 3. This improves the mechanical strength of the metal printed object. When purging oxygen, the shield gas may be used as a purge gas, and the purging method is not particularly limited.

Specifically, purging is preferably performed until the oxygen concentration in the chamber 3 becomes 5% by volume or less. When the content of oxygen in the chamber 3 is 5% by volume or less, the metal powder is less likely to be oxidized and the mechanical strength of the metal printed object is further improved.

In the method for manufacturing a metal printed object of the present embodiment, the mass of the shield gas per unit volume is $1.30 \times 10^{-3}$ g/cm$^3$ or less. The mass per unit volume of the shielding gas is preferably $8.81 \times 10^{-4}$ g/cm$^3$ or less, and more preferably $3.00 \times 10^{-4}$ g/cm$^3$ or less, and most preferably $1.60 \times 10^{-4}$ g/cm$^3$ or less. When the mass of the shield gas per unit volume is $1.30 \times 10^{-3}$ g/cm$^3$ or less, the amount of the sputters generated is reduced. The lower limit of the mass per unit volume of the shield gas is not particularly limited, but can be, for example, $1.00 \times 10^{-4}$ g/cm$^3$ or more.

In the method for manufacturing a metal printed object of the present embodiment, the shield gas preferably contains at least one selected from the group consisting of hydrogen, helium, nitrogen, neon, argon and xenon. The shield gas more preferably contains at least one selected from the group consisting of hydrogen, helium, nitrogen and neon, more preferably contains one or both of hydrogen and helium, and most preferably contains helium. The shield gas may contain one kind of these gas components alone, or may contain two or more kinds in combination. Most preferably, the shield gas contains helium alone.

In the method for manufacturing a metal printed object of the present embodiment, the shield gas preferably contains helium. When the shield gas contains helium, it becomes easy to control the mass per unit volume of the shield gas within the range above. When the shield gas contains helium, the content of helium in the shield gas is preferably 20% by volume or more, more preferably 50% by volume or more, still more preferably 90% by volume or more, relative to 100% by volume of the shield gas. When the shield gas contains 20% by volume or more of helium with respect to 100% by volume of the shield gas, the amount of the sputters generated is further reduced. The upper limit of the content of helium is not particularly limited, but is preferably 100% by volume or less.

The shield gas may include argon. In this case, when the helium content of the shield gas is 20% by volume or more with respect to 100% by volume of the shield gas, the content of argon is preferably 80% by volume or less with respect to 100% by volume of the shield gas. This makes it easier to control the mass of the shield gas per unit volume to $1.30 \times 10^{-3}$ g/cm$^3$ or less.

When the shield gas contains argon, and the content of helium in the shield gas is 50% by volume or more with respect to 100% by volume of the shield gas, the content of argon is preferably 50% by volume or less with respect to 100% by volume of the shield gas. This makes it easier to control the mass of the shield gas per unit volume to $8.81 \times 10^{-4}$ g/cm$^3$ or less.

When the shield gas contains argon and the content of helium in the shield gas is 90% by volume or more with respect to 100% by volume of the shield gas, the content of argon is preferably 10% by volume with respect to 100% by volume of the shield gas. This makes it easier to control the mass of the shield gas per unit volume to $3.00 \times 10^{-4}$ g/cm$^3$ or less.

In the method for manufacturing a metal printed object of the present embodiment, the shield gas may contain oxygen. However, even when the shielding gas contains oxygen, the content of oxygen in the shielding gas is preferably 5% by volume or less with respect to 100% by volume of the shielding gas, and ideally 0% by volume (that is, less than the detection limit value). When the content of oxygen in the shielding gas is 5% by volume or less, the mechanical strength of the metal printed object is improved.

In the method for manufacturing a metal printed object of the present embodiment, the gauge pressure in the chamber 3 is preferably 0 MPa~0.1 MPa, more preferably 0 MPa~0.05 MPa, and further preferably 0 MPa~0.03 MPa. When the gauge pressure is 0.1 MPa or less, the amount of the sputters generated is further reduced.

In the method for manufacturing a metal printed object of the present embodiment, it is preferable to select a composition of the shield gas according to the type of the metal powder used.

For example, metals with an austenitic structure such as austenitic stainless steel and nickel alloys have low hydrogen embrittlement susceptibility. When the metal powder contains an austenite structure metal, the metal powder easily oxidizes, which easily deteriorates the corrosion resistance and the like. Therefore, when the metal powder contains an austenitic stainless steel such as austenitic stainless steel, and nickel alloys, it is preferable to use a reducing gas such as hydrogen gas as the shield gas from the viewpoint of preventing oxidation.

When the metal powder contains an alloy containing iron as a main component, it is preferable that hydrogen gas not be contained in the shield gas from the viewpoint of preventing hydrogen embrittlement.

When the metal powder contains aluminum, titanium, or an alloy containing these as the main components, it is preferable that the shield gas does not contain hydrogen gas from the viewpoint of preventing the formation of blowholes.

After supplying the shielding gas into the chamber 3, a laser is irradiated from the laser oscillator 1 to the metal powder in the chamber 3 as the energy ray. The metal printed object manufacturing apparatus 20 controls the optical system 2 and irradiates the metal powder in the chamber 3 with the laser according to the data input in advance.

By the laser irradiation, the metal powder at the portion irradiated with the laser is sintered, the sintered product of the metal powder is shaped into an arbitrary shape along the drawing line of the laser. As a result, the metal layer is shaped into an arbitrary shape.

When the shaping of the metal layer is completed, the modeling stage 5 moves downward. Next, new metal powder is supplied on the upper side of the formed metal layer. By irradiating the newly supplied metal powder with the laser again, a new metal layer is formed into an arbitrary shape, and the new metal layer is laminated on the upper surface of the metal layer which has already formed. By repeating the laser irradiation, the downward movement of the modeling stage 5, the supply of further powder, and the lamination of metal layers in this order, the metal layers of any shape are sequentially laminated. The metal printed object can be manufactured as a three-dimensional structure.

(Effects)

According to the method for manufacturing a metal printed object according to the present embodiment described above, the mass of the shield gas per unit volume is $1.30 \times 10^{-3}$ g/cm$^3$ or less, so the amount of the sputters generated is reduced.

The reason why the amount of the sputters generated is reduced is not always clear, but it can be considered to be as follows.

In the metal printed object manufacturing apparatus 20, since the metal powder spread on the surface of the base plate 6 is substantially spherical, spaces are formed between the particles of the metal powder. The shield gas enters the spaces between the particles of the metal powder. When the metal powder is irradiated with the laser in this state, the metal powder on the surface of the base plate 6 is melted by heat energy. Therefore, a molten pool containing molten metal powder is formed on the surface of the base plate 6. The term "molten pool" means a molten metal having fluidity.

As described above, the shielding gas has entered the spaces between the particles of the metal powder before the molten pool is formed. Therefore, the shield gas is also heated by the thermal energy of the laser, and the molecules of the shield gas obtain kinetic energy. It is considered that when the molecules of the shield gas, which has obtained kinetic energy, jumps out of the molten pool, the molten metal scatters with the shield gas, and the sputters are observed.

In the method for manufacturing a metal printed object according to the present embodiment, since the mass per unit volume of the shield gas is $1.30 \times 10^{-3}$ g/cm$^3$ or less, the kinetic energy of the gas molecules of the shield gas jumping out of the molten pool becomes relatively small. Therefore, it is considered that the amount of the molten metal scattered from the molten pool is reduced and the amount of the sputters generated is reduced.

Other reasons why the amount of the sputters generated is reduced are as follows.

The inventors of the present invention have confirmed that when using a laser with an output of 200 to 400 W, the temperature of the laser irradiation position on the surface of the base plate 6 reaches a temperature of 2,500° C. or higher. Therefore, it is considered that the metal powder is vaporized and evaporated around the base plate 6 and the shield gas is thermally expanded. As a result, an updraft is likely to occur around the base plate 6. This updraft may wind up the metal powder around the laser irradiation position, and the rolled up metal powder scatters upward while glowing red. In this way, the metal powder that scatters while glowing red is also observed as the sputters.

In the method for manufacturing a metal printed object according to the present embodiment, since the mass per unit volume of the shield gas is $1.30 \times 10^{-3}$ g/cm³ or less, the kinetic energy of the gas molecules of the shield gas that constitutes the ascending air current becomes relatively small, and the amount of the metal powder caught in the ascending air current from the periphery of the laser irradiation position becomes small. As a result, it is considered that the amount of the sputters generated is reduced.

As described above, in the method for manufacturing a metal printed object according to this embodiment, the amount of the sputters generated is reduced. Therefore, the sputters are less likely to be heated many times, less mixed with the metal powder, and the mechanical strength of the metal printed object is improved.

Further, since the number of the sputters existing in the region in which the laser passes can be reduced, the irradiation of the laser is less likely to be blocked by the sputters. As a result, the amount of heat energy supplied to the metal powder is easily maintained at a constant value, and the metal powder can be heated sufficiently. Therefore, according to the method for manufacturing a metal printed object according to the present embodiment, the surface roughness and mechanical strength of the metal printed object are improved.

In the manufacturing of a metal printed object, it may be required to reuse the metal powder remaining in the chamber after manufacturing the metal printed object. However, in the conventional method disclosed in Patent Document 1, fine sputters are inevitably mixed in the metal powder collected from the chamber after manufacturing. On the other hand, according to the method for manufacturing a metal printed object according to the present embodiment, since the amount of the sputters generated is reduced, the sputters are less likely to be mixed into the metal powder collected from the chamber after manufacturing, and the quality of the collected metal powder is improved. As a result, the collection efficiency in recycling metal powder and the quality of metal powder are improved.

Therefore, according to the method for manufacturing a metal printed object according to the present embodiment, it is possible to improve the quality such as the mechanical strength of the metal printed object and to improve the production efficiency of the metal printed object.

Although some embodiments of the present invention have been described above, the present invention is not limited to these particular embodiments. In addition, the present invention may have additions, omissions, substitutions, and other modifications of the configuration within the scope of the gist of the present invention described in the claims.

For example, in the present embodiment described above, the metal printed object manufacturing apparatus has a mode in which the metal powder spread on the upper side of the base plate is irradiated with a laser. However, in another embodiment, the metal printed object manufacturing apparatus may be a mode in which the metal powder is supplied while being sprayed at the laser irradiation position.

EXAMPLES

Hereinafter, the present invention will be described specifically with reference to Examples, but the present invention is not limited to the following description.

(Measuring Method)

The "mass per unit volume [g/cm³]" of gas was measured using a gas density meter (Yokogawa Electric Corporation) under the conditions of a temperature of 25° C. and a pressure of 0.1 MPa.

The "gauge pressure" was measured under the condition of 25° C. using a Bourdon tube pressure gauge.

Example 1

A metal printed object was manufactured with the metal printed object manufacturing apparatus 20. As the laser oscillator 1, Red Power manufactured by SPI Lasers was used. As the optical system 2, a galvanometer mirror was used. The base plate 6 used was made of pure titanium. As the metal powder, a titanium alloy $Ti_6Al_4V$ (LPW Technology Ltd., ϕ 10 μm~45 μm) was used. The laser output value was 200 W, the laser scanning width was 0.05 mm, and the laser scanning speed was 800 mm/s. A layer of the metal powder having a thickness of 30 μm was placed on the base plate 6.

In Example 1, 100% by volume of helium gas was supplied as the shield gas into the chamber 3 at a flow rate of 30 L/min. The gauge pressure in the chamber was 0 MPa. The mass per unit volume of the shield gas in Example 1 was $1.60 \times 10^{-4}$ g/cm³.

Under the conditions above, a 10 mm×10 mm square metal printed object was manufactured. In addition, the 10 mm×10 mm square metal printed object corresponds to a printed object for one layer of the metal layer.

Comparative Example 1

In Comparative Example 1, a 10 mm×10 mm square metal printed object was manufactured in the same manner as in Example 1 except that 100% by volume of argon gas was used as the shield gas. The mass per unit volume of the shield gas in Comparative Example 1 was $1.60 \times 10^{-3}$ g/cm³.

Figure 2:
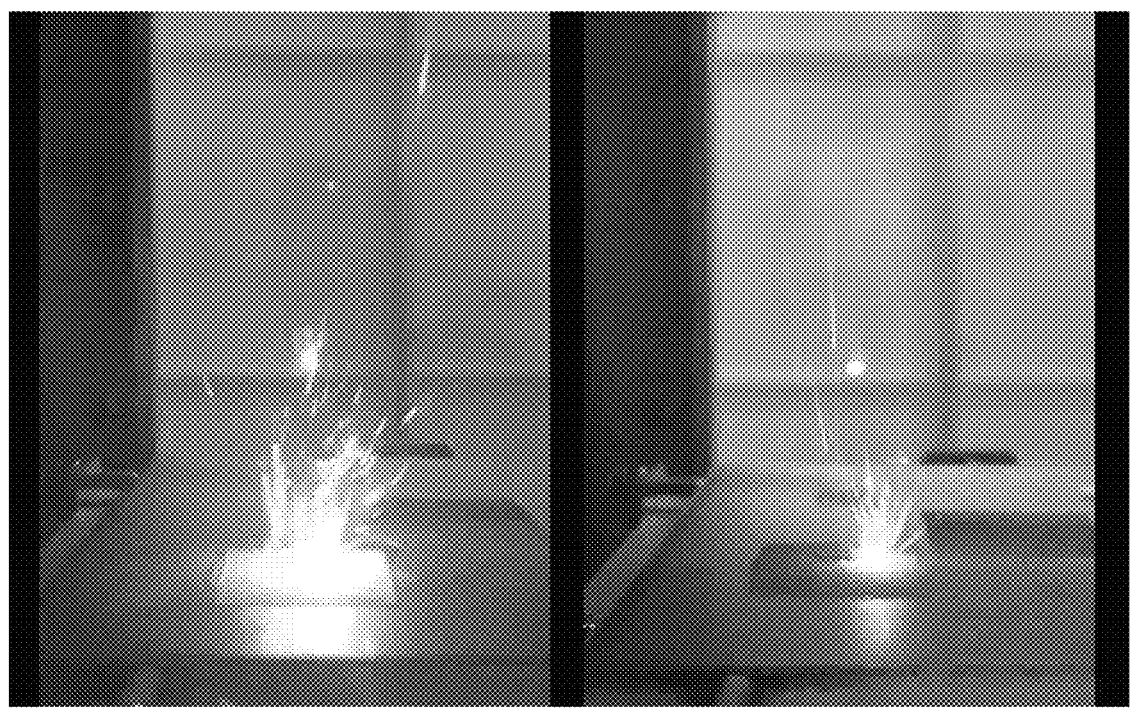
FIG. 2 is a photograph showing sputters generation in Example 1 and Comparative Example 1. The photograph on the left side shows sputters generation when laser irradiation was performed in the presence of 100% by volume of argon gas (Comparative Example 1). The photograph on the right side shows sputter generation when laser irradiation was performed in the presence of 100% by volume of helium gas (Example 1).

FIG. 2 is a photograph showing the generation of sputters in Example 1 and Comparative Example 1. The photograph on the left side of FIG. 2 is a photograph showing the generation of the sputters when laser irradiation was performed in the presence of 100 vol % argon gas in Comparative Example 1. The photograph on the right side of FIG. 2 is a photograph showing the generation of the sputters when laser irradiation was performed in the presence of 100 vol % helium gas in Example 1. As shown in FIG. 2, it was confirmed that when 100 vol % helium gas was used as the shield gas, the amount of the sputters generated was reduced.

Figure 3:
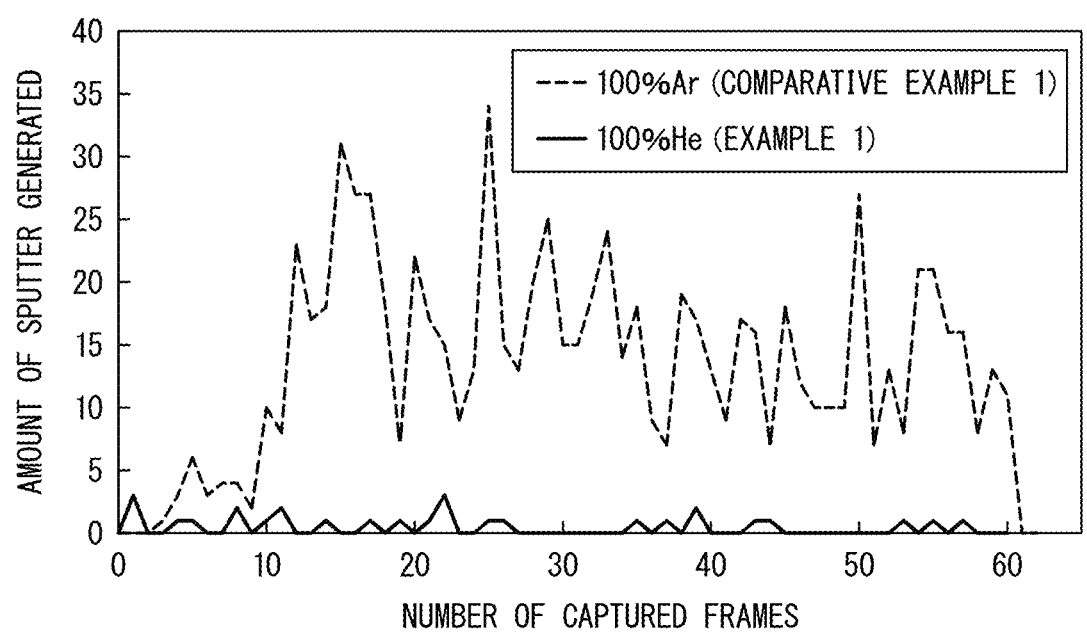
FIG. 3 is a graph showing an amount of the sputters generated in Example 1 and Comparative Example 1.

FIG. 3 is a graph showing the amount of the sputters generated in Example 1 and Comparative Example 1. A sputters measuring system developed by our company (Japanese Patent Application No. 2018-081895) was used to measure the amount of the sputters generated. This product can count the number of the sputters generated by analyzing the moving images captured by a video. The graph of FIG. 3 shows the number of the sputters counted with respect to the number of the captured frames, and shows the result when using 100% by volume of argon gas as the shield gas in Comparative Example 1, and when using 100% by volume of helium gas as the shield gas in Example 1.

The number of the captured frames is a number of frames (the number of still images and the number of frames) to be processed per unit time in a moving image. Usually, it is expressed by a numerical value (fps) per second. In Example 1, when the number of the captured frames is 0 to 60, the number of the sputters generated was less than 5. Therefore, it can be understood that the generation rate is reduced regardless of the size of the sputters. On the other hand, in Comparative Example 1, the number of the sputters generated was higher than that in Example 1, regardless of the number of the captured frames.

Examples 2 to 6, and Comparative Examples 1 to 3

A 10 mm×10 mm square metal printed object was manufactured in the same manner as in Example 1, except that the composition of the shield gas was changed as shown in Table 1.
(Amount of Sputters Generated)

During the manufacturing of the metal printed objects in Examples 1 to 6 and Comparative Examples 2 and 3, the amount of the sputters generated was visually observed, and the amount of the sputters generated was evaluated using the amount of the spatter generated in Comparative Example 1 as a reference value as shown below.
- ○: The frequency and the amount of the sputters generated were effectively reduced.
- Δ: The frequency and the amount of the sputters were slightly reduced.
- x: The frequency and the amount of the sputters were not reduced.

Examples 7 to 10 and Comparative Example 4

In Examples 7 to 10 and Comparative Example 4, the apparatus used in Examples 1 to 6 and Comparative Examples 1 to 3 was used to quantify the amount of the sputters generated under each shield gas condition.

In Examples 7 to 10 and Comparative Example 4, the following operations were changed.

A layer of the metal powder (area: 100 mm×100 mm) was irradiated with a laser to manufacture a 10 mm×10 mm square metal printed object. On top of the metal printed object, a layer of the metal powder (area 100 mm×100 mm) was placed again with a thickness of 30 μm. Then, laser irradiation was performed.

Such a procedure of placing of the metal powder→laser irradiation→placing of the metal powder→laser irradiation→was repeated about 350 times to manufacture a cubic metal printed object of 10 mm×10 mm×10 mm.

After manufacturing the metal printed object, the metal powder that was not used for modeling was classified using a sieve with a pore size of 100 μm. The sputters having a size of 100 μm or more could not pass through the sieve and remained on the sieve.

Figure 4:
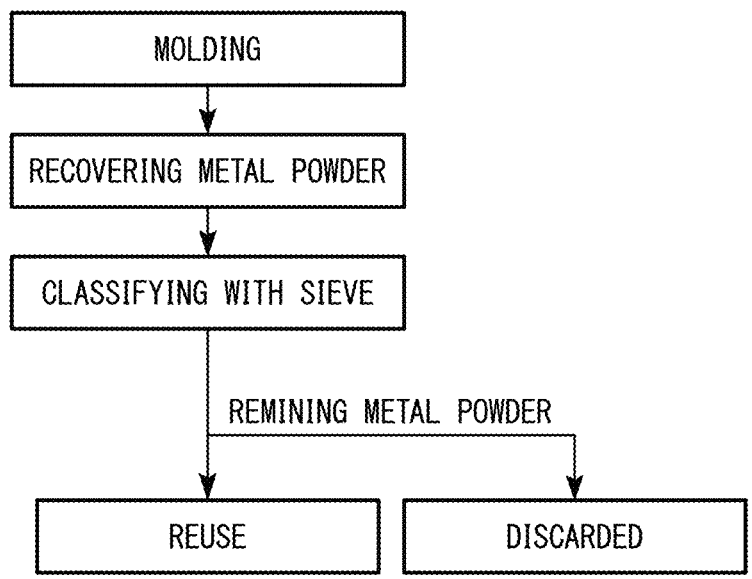
FIG. 4 is a process chart showing a process of reusing the material powder.

FIG. 4 shows the process of reusing the metal powder. In Examples 7 to 10 and Comparative Example 4, the mass of the residual metal powder to be discarded was measured and the amount of the sputters generated was quantified.

In Example 7, 100% by volume of helium gas was supplied into the chamber 3 at a flow rate of 30 L/min. The gauge pressure in the chamber was 0 MPa. The mass per unit volume of the shield gas of Example 7 was $1.60 \times 10^{-4}$ g/cm$^3$.

In Example 8, a gas in which helium gas and argon gas were mixed at a mixing ratio of 80% by volume and 20% by

TABLE 1

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Helium [% by volume] | 100 | 99 | 95 | 80 | 50 | 20 | — | — | — |
| Argon [% by volume] | — | — | — | 20 | 50 | 80 | 100 | 99 | 95 |
| Oxygen [% by volume] | 0 | 1 | 5 | 0 | 0 | 0 | 0 | 1 | 5 |
| Mass per unit volume [×10$^{-3}$ g/cm$^3$] | 0.160 | 0.171 | 0.217 | 0.448 | 0.880 | 1.31 | 1.60 | 1.60 | 1.59 |
| Evaluation of amount of sputter generated | ○ | ○ | Δ | ○ | ○ | Δ | — | x | x |

In Examples 1 to 6, since the mass per unit volume of the shield gas was $1.30 \times 10^{-3}$ g/cm$^3$ or less, a reduction in the amount of the sputters generated was observed.

Further, as shown in Example 3, even when the shield gas contained 5% by volume of oxygen, the amount of the sputters generated was at a lower level than that in Comparative Example 1 in which the shield gas did not contain oxygen. From this, it is suggested that when purging the oxygen gas in the chamber 3, the generation amount of the sputters can be reduced without necessarily making the oxygen concentration close to zero. Therefore, there is possibility that the amount of the shield gas used at the time of purging can be reduced, and the manufacturing cost of the metal printed object may be reduced.

Table 1 shows examples in which the oxygen concentration is described as "0"% by volume, which means that the oxygen concentration is less than 20 ppm (that is, the oxygen gas detection limit value).

volume respectively was supplied into the chamber 3 at a flow rate of 30 L/min. The gauge pressure in the chamber was 0 MPa. The mass per unit volume of the shield gas of Example 8 was $4.48 \times 10^{-4}$ g/cm$^3$.

In Example 9, a gas in which helium gas and argon gas were mixed at a mixing ratio of 50% by volume and 50% by volume respectively was supplied into the chamber 3 at a flow rate of 30 L/min. The gauge pressure in the chamber was 0 MPa. The mass per unit volume of the shield gas of Example 9 was $8.80 \times 10^{-4}$ g/cm$^3$.

In Example 10, a gas in which helium gas and argon gas were mixed at a mixing ratio of 20% by volume and 80% by volume respectively was supplied into the chamber 3 at a flow rate of 30 L/min. The gauge pressure in the chamber was 0 MPa. The mass per unit volume of the shield gas of Example 10 was $1.31 \times 10^{-3}$ g/cm$^3$.

In Comparative Example 4, 100% by volume of argon gas was supplied into the chamber 3 at a flow rate of 30 L/min. The gauge pressure in the chamber was 0 MPa. The mass per unit volume of the shield gas of Comparative Example 4 was $1.60 \times 10^{-3}$ g/cm$^3$.

Figure 5:
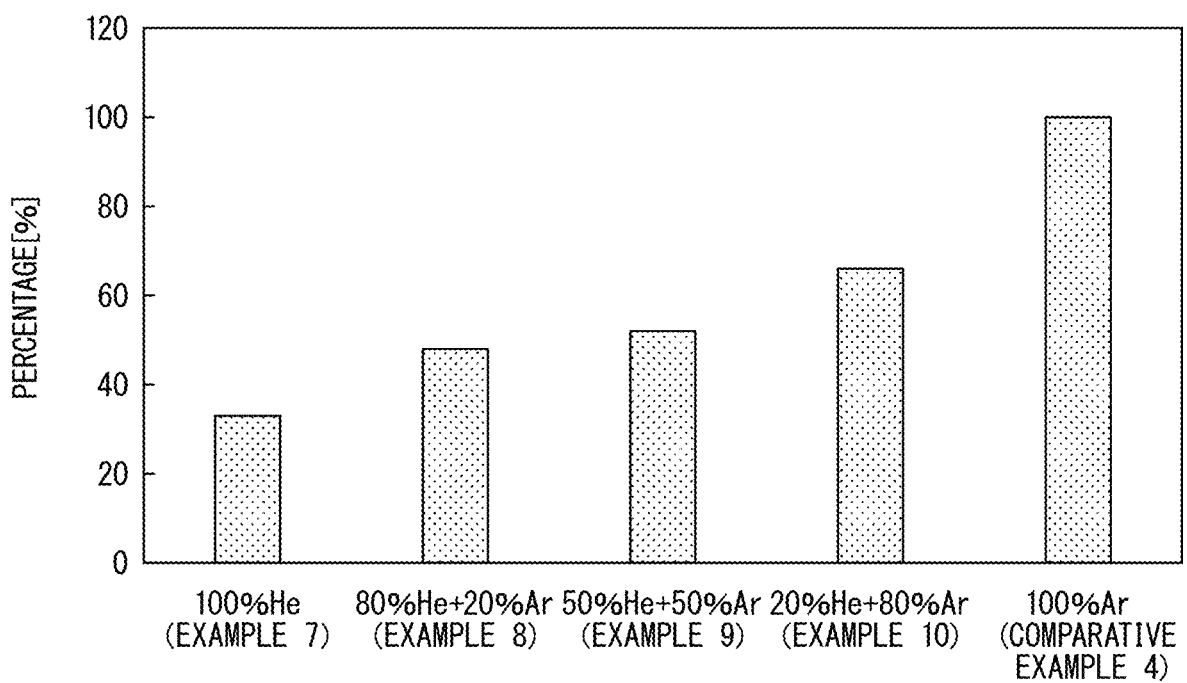
FIG. 5 is a graph showing mass of residual metal powder in various shield gases.

FIG. 5 shows the mass of the residual metal powder in various shield gases. The results are shown assuming that the mass of the residual metal powder when 100% by volume of argon gas was used as the shielding gas (Comparative Example 4) is 100%. In Example 6 in which a gas having a mass per unit volume of $1.31 \times 10^{-3}$ g/cm$^3$ and mixed with helium gas and argon gas at a mixing ratio of 20% by volume and 80% by volume was used, the metal powder remaining without passing through the sieve was reduced to ⅔ of the amount of the residual metal powder of Comparative Example 4. Furthermore, when the mass per unit volume of the shielding gas decreased, the amount of the residual metal powder further decreased.

From the results of the Examples above, it was confirmed that the amount of sputters generated could be effectively reduced when the mass of the shield gas per unit volume was $1.30 \times 10^{-3}$ g/cm$^3$ or less.

EXPLANATION OF REFERENCE NUMERALS

1 laser oscillator
2 optical system
3 chamber
4 shield gas supply source
5 printing stage
6 base plate
7 pipeline
20 metal printed object manufacturing apparatus

The invention claimed is:

1. A method for manufacturing a metal printed object in which, in the presence of a shielding gas supplied around metal powder in a chamber, heat is supplied to the metal powder using energy rays to form a metal layer and the metal layer is laminated,
    wherein the mass per unit volume of the shielding gas at a temperature of 25° C. and a pressure of 0.1 MPa is $0.448 \times 10^{-3}$ g/cm$^3$ or less, and
    wherein a gauge pressure of the shielding gas in the chamber is 0 to 0.1 MPa, and
    wherein the shield gas contains 1% by volume or less of oxygen with respect to 100% by volume of the shielding gas.

2. The method for manufacturing a metal printed object according to claim 1,
    wherein the shielding gas contains 80% by volume or more of helium with respect to 100% by volume of the shielding gas.

3. The method for manufacturing a metal printed object according to claim 1,
    wherein a composition of the shield gas is selected according to the metal powder.

4. The method for manufacturing a metal printed object according to claim 2,
    wherein a composition of the shield gas is selected according to the metal powder.

* * * * *